US012589654B2

(12) United States Patent
An et al.

(10) Patent No.: US 12,589,654 B2
(45) Date of Patent: Mar. 31, 2026

(54) DISPLAY DEVICE AND CONTROL METHOD THEREOF

(71) Applicant: HYUNDAI MOBIS CO., LTD., Seoul (KR)

(72) Inventors: Hyun Jun An, Gunpo-si (KR); Kyung Hoon Kim, Seongnam-si (KR); Shin Jik Lee, Hwaseong-si (KR); In Seok Song, Seoul (KR); Sung Joon Ahn, Seoul (KR); Ji Soo Shin, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/772,704

(22) Filed: Jul. 15, 2024

(65) Prior Publication Data

US 2025/0214438 A1      Jul. 3, 2025

(30) Foreign Application Priority Data

Dec. 28, 2023      (KR) ......................... 10-2023-0194169

(51) Int. Cl.
*H04N 5/77* (2006.01)
*B60K 35/22* (2024.01)
*B60K 35/53* (2024.01)

(52) U.S. Cl.
CPC .............. *B60K 35/53* (2024.01); *B60K 35/22* (2024.01); *B60K 2360/21* (2024.01); *B60K 2360/84* (2024.01)

(58) Field of Classification Search
USPC ....................................................... 348/837
See application file for complete search history.

(56) References Cited

U.S. PATENT DOCUMENTS

| | | | |
|---|---|---|---|
| 11,639,134 B1 * | 5/2023 | Huizen ................... | B60R 1/088 |
| | | | 348/77 |
| 11,673,598 B2 * | 6/2023 | Nakajima .............. | B60K 35/22 |
| | | | 280/779 |
| 11,752,872 B2 * | 9/2023 | Kadam ................. | B60R 21/205 |
| | | | 296/70 |
| 12,122,322 B2 * | 10/2024 | Morosawa .......... | B60R 25/2045 |
| 12,128,822 B1 * | 10/2024 | Van Wiemeersch ......................... | |
| | | | H05B 47/155 |
| 12,187,165 B2 * | 1/2025 | Ohno ....................... | B60N 2/01 |

(Continued)

FOREIGN PATENT DOCUMENTS

| | | |
|---|---|---|
| DE | 10 2016 009 989 A1 | 2/2017 |
| DE | 10 2023 000 349 A1 | 3/2023 |
| DE | 10 2021 214 768 A1 | 6/2023 |

OTHER PUBLICATIONS

Extended European Search Report issued on Mar. 26, 2025, in counterpart European Patent Application No. 24193482.7. (9 pages in English).

*Primary Examiner* — Nigar Chowdhury
(74) *Attorney, Agent, or Firm* — NSIP Law

(57) ABSTRACT

A display device for a vehicle, a method therefor, and a system therefor are provided. The display device includes a front display positioned in front of a driver seat and a passenger seat of the vehicle, and a drive module linked to a camera to adjust a position of the front display based on a position of a specific facial portion of an occupant in the driver seat or the passenger seat. The drive module provides a driving force to enable movement of the front display.

18 Claims, 11 Drawing Sheets

(56) References Cited

U.S. PATENT DOCUMENTS

| | | | | |
|---|---|---|---|---|
| 2010/0262336 A1* | 10/2010 | Rivas | H04N 21/23614 | |
| | | | 701/1 | |
| 2017/0054949 A1* | 2/2017 | Shaw | G06V 20/593 | |
| 2017/0098425 A1* | 4/2017 | Takamatsu | G09G 5/00 | |
| 2017/0313248 A1* | 11/2017 | Kothari | B60K 35/10 | |
| 2018/0134116 A1* | 5/2018 | Chen | B60H 1/00742 | |
| 2018/0182261 A1* | 6/2018 | Naouri | G09B 19/167 | |
| 2018/0186274 A1* | 7/2018 | Gurin | B62D 39/00 | |
| 2019/0047498 A1* | 2/2019 | Alcaidinho | B60H 1/00742 | |
| 2020/0238952 A1* | 7/2020 | Lindsay | G06V 30/194 | |
| 2020/0254906 A1* | 8/2020 | Luchner | B60T 7/042 | |
| 2020/0257294 A1* | 8/2020 | Ishioka | G05D 1/0088 | |
| 2020/0283015 A1* | 9/2020 | Yashiro | G05D 1/0257 | |
| 2020/0298885 A1* | 9/2020 | Yashiro | B60W 60/0053 | |
| 2020/0307643 A1* | 10/2020 | Ikeda | B60K 35/80 | |
| 2020/0349666 A1* | 11/2020 | Hodge | G01C 21/3602 | |
| 2020/0410790 A1* | 12/2020 | Thompson | G01N 21/8851 | |
| 2021/0001862 A1* | 1/2021 | Senechal | G06V 20/593 | |
| 2021/0023946 A1* | 1/2021 | Johnson | B60K 35/235 | |
| 2021/0191552 A1* | 6/2021 | Bok | H10K 59/38 | |
| 2021/0312169 A1* | 10/2021 | Pham | B60R 11/04 | |
| 2021/0394698 A1* | 12/2021 | Tanabe | B60N 2/777 | |
| 2022/0230456 A1* | 7/2022 | Kasarla | G06V 20/593 | |
| 2022/0314799 A1* | 10/2022 | Maeda | B60K 35/60 | |
| 2023/0022436 A1* | 1/2023 | Hudson | B60R 11/04 | |
| 2023/0036188 A1* | 2/2023 | Schmidt | G06Q 20/3224 | |
| 2023/0057766 A1* | 2/2023 | Salter | B60J 7/043 | |
| 2023/0244320 A1* | 8/2023 | Tang | G06V 40/28 | |
| | | | 345/156 | |
| 2023/0311659 A1* | 10/2023 | Shimura | B60K 35/00 | |
| | | | 701/36 | |
| 2023/0406363 A1* | 12/2023 | Perumalla | B60W 60/0053 | |
| 2023/0421726 A1* | 12/2023 | Anderson | B60R 1/22 | |
| 2024/0036642 A1* | 2/2024 | Wood | B60K 35/654 | |
| 2024/0087339 A1* | 3/2024 | Ishida | H04R 1/00 | |
| 2024/0087491 A1* | 3/2024 | Jiang | B60K 35/81 | |
| 2024/0239265 A1* | 7/2024 | Mossey | B60R 1/29 | |
| 2024/0246412 A1* | 7/2024 | Hanson, II | G06Q 30/0265 | |

* cited by examiner

DISPLAY DEVICE AND CONTROL METHOD THEREOF

CROSS-REFERENCE TO RELATED APPLICATION(S)

This application claims the benefit under 35 USC § 119 of Korean Patent Application No. 10-2023-0194169, filed on Dec. 28, 2023, in the Korean Intellectual Property Office, the entire disclosure of which is hereby incorporated by reference for all purposes.

BACKGROUND

1. Field

The present disclosure relates to a display device for adjusting a height thereof depending on a position of a specific facial portion of a driver in a vehicle and control method thereof.

2. Description of the Related Art

A center fascia display of a vehicle may display various visual information about the vehicle. Such a display device may also be installed on a dashboard of a vehicle disposed in front of a driver's seat and a front passenger seat, and provides various convenience information such as navigation, vehicle management and operation, Internet, and entertainment.

With the digitization of vehicles, various convenience information is being provided through diverse communication functions. For example, the location of a vehicle is checked remotely via the Internet or a smartphone, and nearby charging stations are discovered. In addition, all information on the current state of the vehicle is monitored in real time. For example, battery charging or pre-conditioning is capable of being easily activated with just a touch of a button. Moreover, intelligent driving assistance systems acquire information on road travel, thereby creating a more convenient driving environment for drivers.

Recently, display devices mounted on vehicles are becoming larger, and thus, there is a need for means to effectively display various convenience information.

Furthermore, there is an increasing demand for the manipulation and operation of display devices capable of providing more effective usability to drivers and passengers.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Accordingly, the present disclosure is directed to a display device and control method thereof that substantially obviate one or more problems due to limitations and disadvantages of the related art.

The present disclosure aims to provide a display device and control method thereof. Specifically, the present disclosure aims to provide a display device for effectively providing various convenience information by adjusting the position (e.g., height) of a display depending on the position of a specific facial portion of a driver and control method thereof.

The present disclosure aims to provide a display device for efficiently controlling the movement and tilting of a display through a drive module including a ball screw member and a link member and control method thereof.

The present disclosure aims to provide a display device for organically controlling the movement of a display through a four-bar linkage structure involving four rotation points formed on a first link, a second link, and a support bracket and control method thereof.

It will be appreciated by persons skilled in the art that the objects that could be achieved with the present disclosure are not limited to what has been particularly described hereinabove and the above and other objects that the present disclosure could achieve will be more clearly understood from the following detailed description.

In a general aspect of the disclosure, a display device for a vehicle, includes: a front display positioned in front of a driver seat and a passenger seat of the vehicle; and a drive module linked to a camera installed in the vehicle and configured to adjust a position of the front display based on a position of a specific facial portion of an occupant in the driver seat or the passenger seat, wherein the drive module is configured to provide a driving force to enable movement of the front display.

The display device may further include a support bracket coupled to a rear surface of the front display, and the drive module may include: a link member rotatably coupled to the support bracket; and a ball screw member connected to the link member and configured to move in a straight line and rotate the link member.

The support bracket may include: a first rotation protrusion formed on a first side thereof; and a second rotation protrusion formed on a second side thereof, wherein the link member includes: a first link into which the first rotation protrusion is inserted on a first side thereof, wherein the first link comprises a first guide groove formed longitudinally; and a second link into which the second rotation protrusion is inserted on the first side thereof.

The drive module may further include a fixed bracket formed to rotatably couple a second side of the first link and a second side of the second link.

The fixed bracket may include a guide plate having formed thereon a second guide groove into which the first rotation protrusion is inserted, and the second guide groove may guide a curved movement of the support bracket.

The drive module may further include: a rotation shaft coupled to the second side of the first link; and a rotation plate extending from an outer peripheral surface of the rotation shaft and coupled to the ball screw member.

The ball screw member may include: a drive motor; a ball screw bolt configured to rotate based on an operation of the drive motor; and a ball screw nut configured to move in a straight line based on the rotation of the ball screw bolt.

The drive module may include a position sensor to detect the position of the front display.

The position of the front display may include a height of the display.

The movement of the front display may include at least one of a linear movement, a rotational movement, a movement in a curved path, or any combination thereof.

In another general aspect of the disclosure, a method of controlling a position of a display device for a vehicle, includes: recognizing a position of a specific facial portion of an occupant in a driver seat or a front passenger seat of the vehicle by a camera installed in the vehicle; determining an operation amount of movement for a ball screw member of a drive module based on the recognized position of the specific facial portion; and adjusting a position of a front display located in front of the driver seat and the passenger seat of the vehicle by rotating a link member of a drive module based on an operation of the ball screw member.

The method may further include: receiving an operation signal from the occupant to adjust the position of the front display; and readjusting the position of the front display based on to the received operation signal.

The position of the front display may include a height of the display.

The movement of the front display may include at least one of a linear movement, a rotational movement, a movement in a curved path, or any combination thereof.

The operation signal from the driver or the a passenger may be actuated by a touch on a screen of the display.

The display may be automatically adjusted by the operation signal that is based on detection of the position of the specific facial portion of the driver or the passenger by the camera.

In yet another general aspect of the disclosure, a system for adjusting a position of a display device in a vehicle, includes: a front display located in front of a driver seat and a passenger seat of the vehicle; a camera configured to detect a position of a specific facial portion of an occupant in the driver seat or the passenger seat; a drive module in communication with the camera and configured to provide a driving force to enable movement of the front display; a processor configured to control the drive module to adjust a position of the front display to provide optimal viewing by the occupant.

The movement of the front display may include at least one of a linear movement, a rotational movement, a movement in a curved path, or any combination thereof.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Description will now be given in detail according to exemplary embodiments disclosed herein, with reference to the accompanying drawings. The same or equivalent components may be provided with the same reference numbers, and description thereof will not be repeated. As used herein, the suffixes "module" and "part" are added or used interchangeably to facilitate preparation of this specification and are not intended to suggest distinct meanings or functions. In describing embodiments disclosed in this specification, relevant well-known technologies may not be described in detail in order not to obscure the subject matter of the embodiments disclosed in this specification. In addition, it should be noted that the accompanying drawings are only for easy understanding of the embodiments disclosed in the present specification, and should not be construed as limiting the technical spirit disclosed in the present specification. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, it will be understood that when an element is referred to as being "directly connected with" another element, there are no intervening elements present.

A singular representation may include a plural representation unless it represents a definitely different meaning from the context.

The terms such as "include" or "have" used herein are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Figure 1:
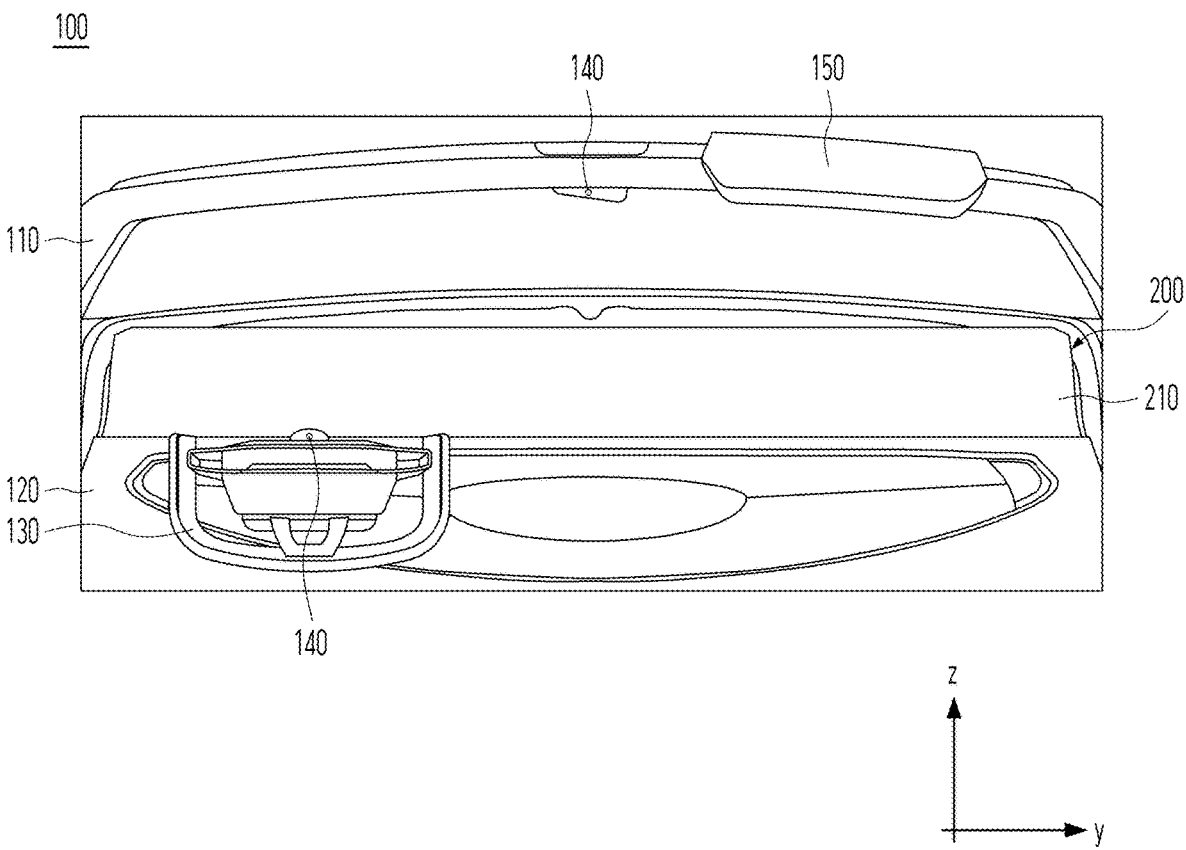
FIG. 1 is a diagram illustrating a vehicle according to an embodiment of the present disclosure.
Figure 2:
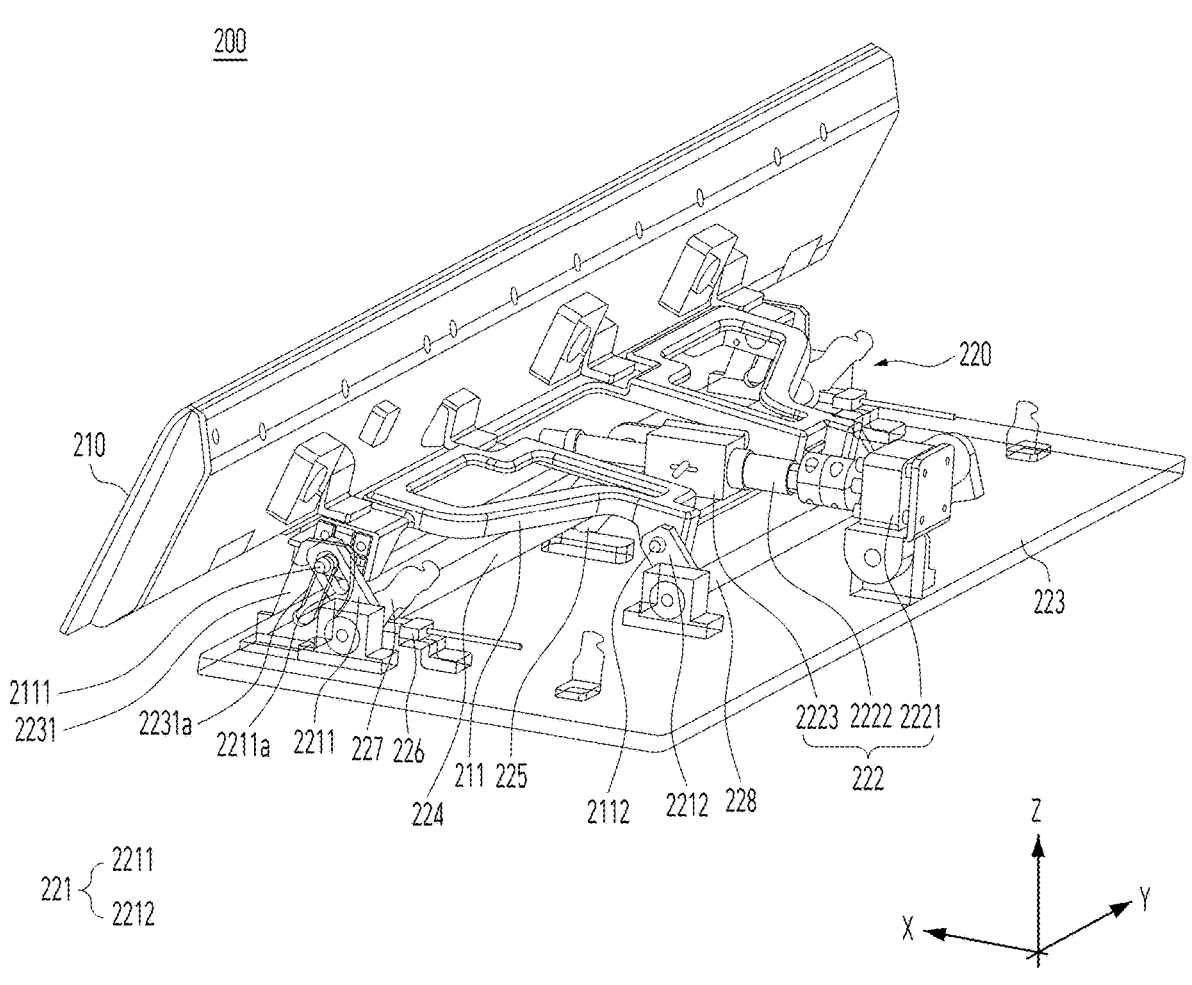
FIG. 2 is a perspective view of a display device according to an embodiment of the present disclosure.
Figure 3:
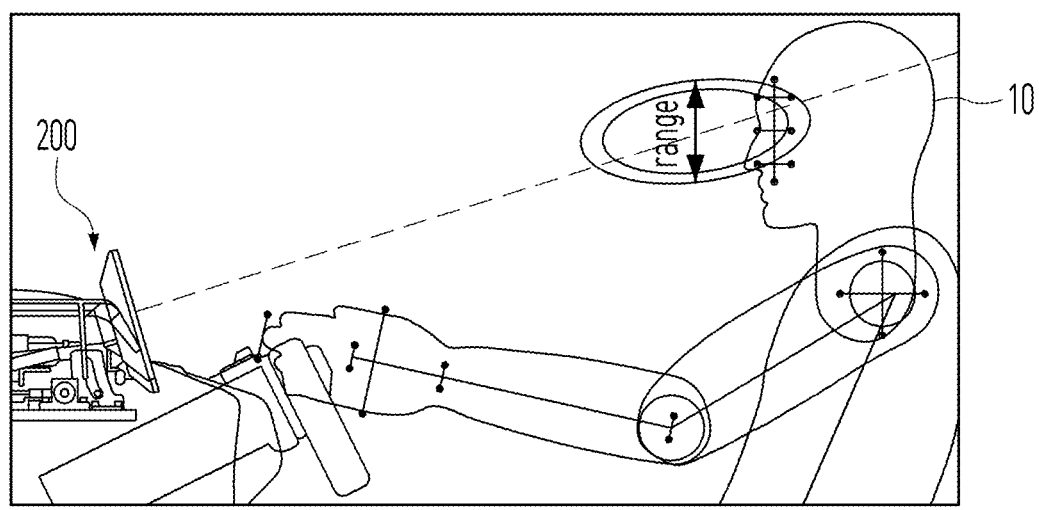
FIG. 3 is a diagram for explaining a method of recognizing the position of a specific facial portion of a driver in a display device according to an embodiment of the present disclosure.
Figure 3:
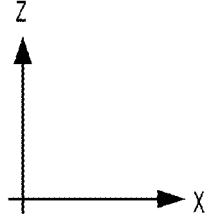

FIG. 1 is a diagram illustrating a vehicle 100 according to an embodiment of the present disclosure. FIG. 2 is a perspective view of a display device 200 according to an embodiment of the present disclosure. FIG. 3 is a diagram for explaining a method of recognizing the position of a specific facial portion of a driver 10 in a display device 200 according to an embodiment of the present disclosure.

Hereinafter, in describing the display device 200 according to the embodiment of the present disclosure, it is assumed that the front and rear direction is the x-axis direction, the left and right direction is the y-axis direction, and the up and down direction is the z-axis direction.

FIG. 1 is a diagram illustrating the vehicle 100 according to the embodiment of the present disclosure. Specifically, FIG. 1 shows the front of a driver seat and a front passenger seat inside the vehicle 100.

As shown in FIG. 1, the display device 200 may be mounted on a mounting portion 120 located on a vehicle body 110. The mounting portion 120 may include a dashboard positioned in front of the driver seat and front passenger seat. In addition, the display device 200 may include a front display 210 positioned in front of the driver seat and front passenger seat of the vehicle 100. As illustrated in FIG. 2, the display device 200 may include a drive module 220 for adjusting the height of the front display 210.

In addition, a steering wheel 130 may be positioned in front of the driver seat. The steering wheel 130 mounted on the vehicle 100 according to the embodiment of the present disclosure may include a D-shaped steering wheel 130 to secure a better view of the driver towards the front display 210. A camera 140 may be positioned on the top of the mounting portion 120 or vehicle body 110.

The camera 140 mounted on the vehicle 100 may play a role in recognizing the position of the specific facial portion of the driver. The drive module 220 is linked to the camera 140 and configured to adjust the height of the front display 210 depending on the position of the specific facial portion of the driver.

Referring to FIG. 3, the display device 200 according to the embodiment of the present disclosure may recognize the position of the specific facial portion (e.g., eyes or nose) of the driver 10 through the camera 140. In an embodiment, while the driver 10 is sitting on the seat, the position of the specific facial portion of the driver 10 may be recognized within a range shown in FIG. 3 based on a height value, which is a z-axis coordinate value.

Additionally, in the vehicle 100 according to the embodiment of the present disclosure, a passenger airbag 150 may be installed on an upper front portion of the passenger seat in response to enlargement of the display device 200 and adjustment of the height of the front display 210, which will be described later. Accordingly, the present disclosure may promote the safety of passengers as well as provide the display device 200 customized for the passengers.

FIG. 2 is a perspective view of a display device 200 according to an embodiment of the present disclosure.

The display device 200 according to the embodiment of the present disclosure may include a drive module 220 that is linked to a front display 210 positioned in front of a driver seat and a passenger seat of a vehicle 100 and a camera 140 mounted on the vehicle 100 and configured to adjust the height of the front display 210 depending on the position of a specific facial portion of a driver. The drive module 220 may provide driving force to the front display 210 to allow the front display 210 to rotate and move in a curved path.

A support bracket 211 may be coupled to the rear surface of the front display 210. The drive module 220 may include a link member 221 rotatably coupled to the support bracket 211. The drive module 220 may include a ball screw member 222 that is connected to the link member 221, moves in a straight line, and rotates the link member 221.

The support bracket 211 may include a first rotation protrusion 2111 formed on one side thereof and a second rotation protrusion 2112 formed on the other side thereof. The link member 221 may include a first link 2211 into which the first rotation protrusion 2111 is inserted on one side thereof and a second link 2212 into which the second rotation protrusion 2112 is inserted on the one side thereof. In particular, the first link 2211 may include a first guide groove 2211a formed longitudinally.

The drive module 220 may include a fixed bracket 223 formed to rotatably couple the other side of the first link 2211 and the other side of the second link 2212. The fixed bracket 223 may include a guide plate 2231 into which the first rotation protrusion 2111 is inserted. In particular, the guide plate 2231 may include a second guide groove 2231a formed to guide the curved movement of the support bracket 211.

The drive module 220 may include a rotation plate 225. The rotation plate 225 is formed by extending from a rotation shaft 224 coupled to the other side of the first link 2211 and the outer peripheral surface of the rotation shaft 224. In addition, the rotation plate 225 is coupled to the ball screw member 222. A second rotation shaft 228 may be coupled to the other side of the second link 2212. Therefore, a pair of link members 221 may be rotated simultaneously through the rotation shaft 224.

The ball screw member 222 may include a drive motor 2221, a ball screw bolt 2222, and a ball screw nut 2223. The ball screw bolt 2222 rotates when driven by the drive motor 2221, and the ball screw nut 2223 moves linearly due to the rotation of the ball screw bolt 2222. In this case, the rotation plate 225 may be rotatably coupled to the ball screw nut 2223. Therefore, as the ball screw nut 2223 moves in a straight line, the rotation plate 225 may rotate with the rotation shaft 224, enabling the rotation of the first link 2211.

Additionally, the display device 200 according to the embodiment of the present disclosure may include a position detection sensor 226 that detects the height of the front display 210. The drive module 220 may include a detection plate 227 that extends from the outer peripheral surface of the rotation shaft 224 at a position corresponding to the position detection sensor 226.

Hereinafter, a method of operating the components included in the display device 200 according to the embodiment of the present disclosure will be described in more detail.

Figure 8:
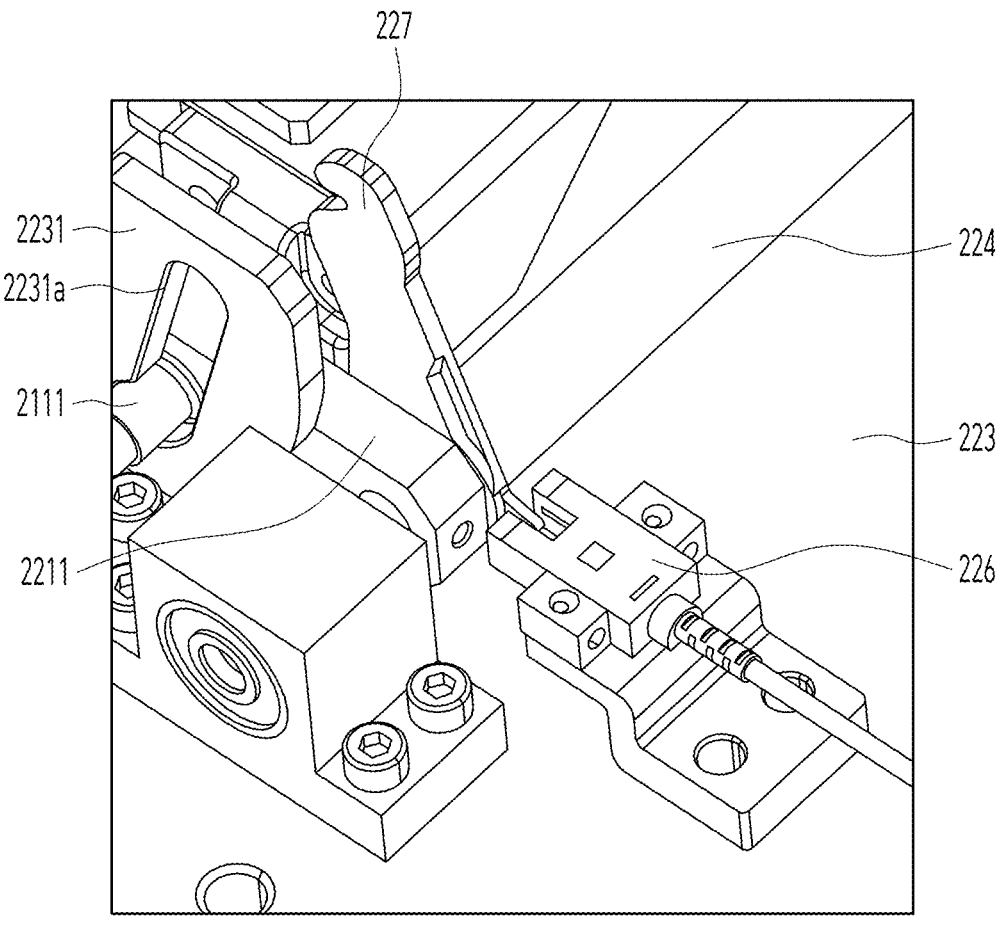
FIG. 8 is a diagram for explaining a method of detecting the height of a front display through a position detection sensor in a display device according to the embodiment of the present disclosure.

FIGS. 4 to 7 are diagrams for explaining a method of adjusting the height of a front display 210 in a display device 200 according to an embodiment of the present disclosure. FIG. 8 is a diagram for explaining a method of detecting the height of a front display 210 through a position detection sensor 226 in a display device 200 according to the embodiment of the present disclosure.

Specifically, FIGS. 4 to 7 show that the height of the front display 210 is adjusted by the operation of a drive module 220 and the height of the front display 210 changes from the lowest point to the highest point.

Figure 4:
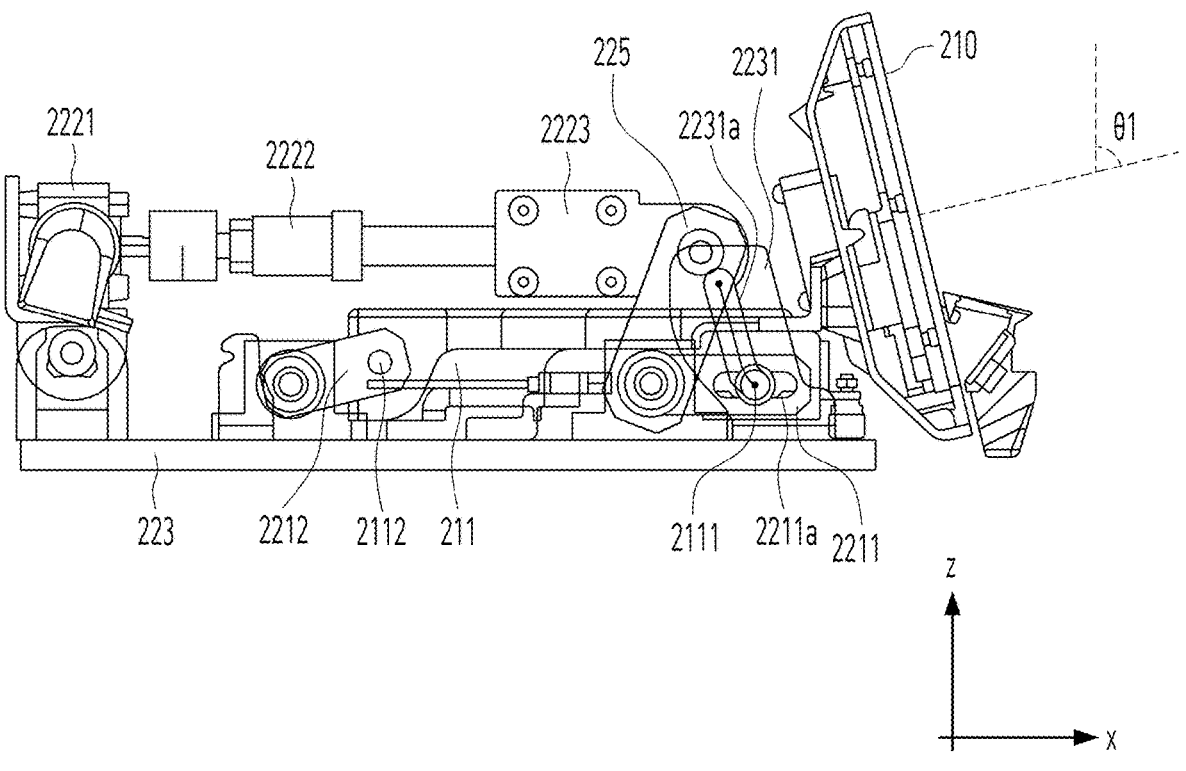
FIGS. 4 to 7 are diagrams for explaining a method of adjusting the height of a front display in a display device according to an embodiment of the present disclosure.
Figure 5:
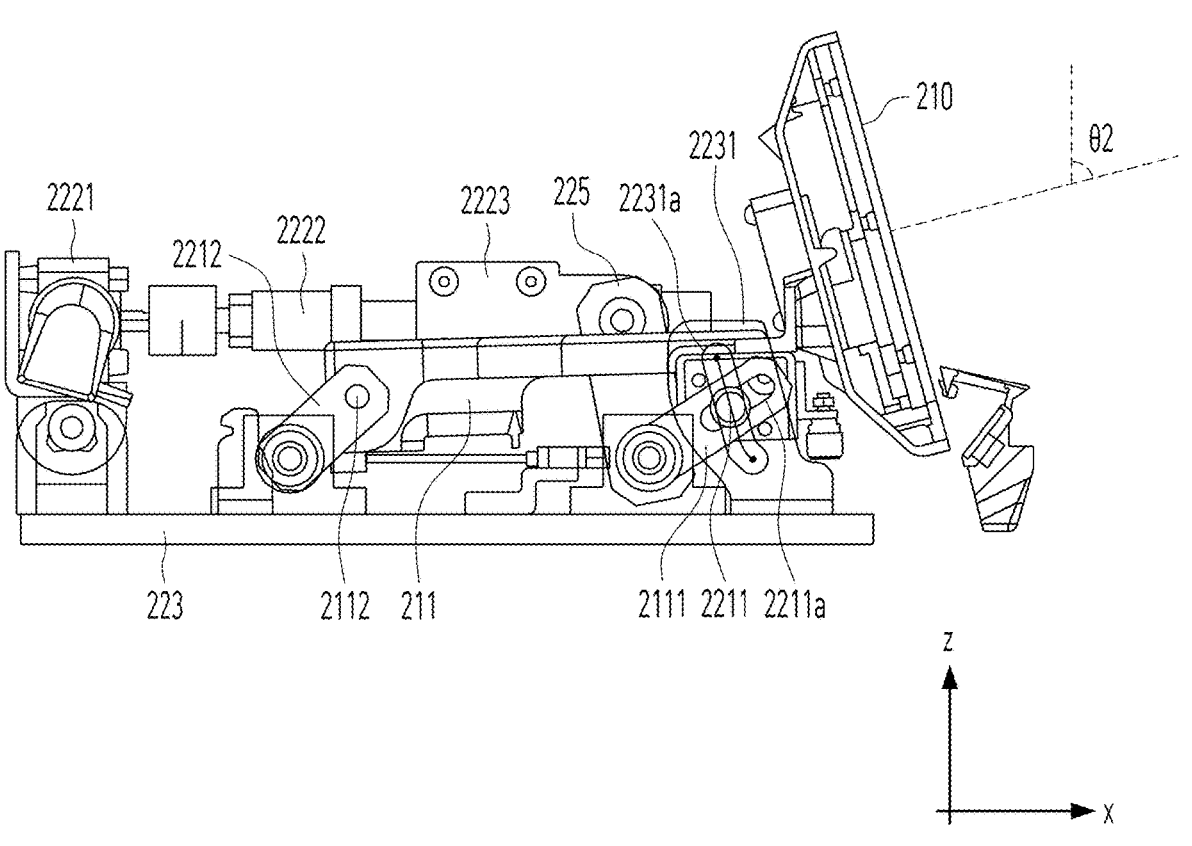
Figure 6:
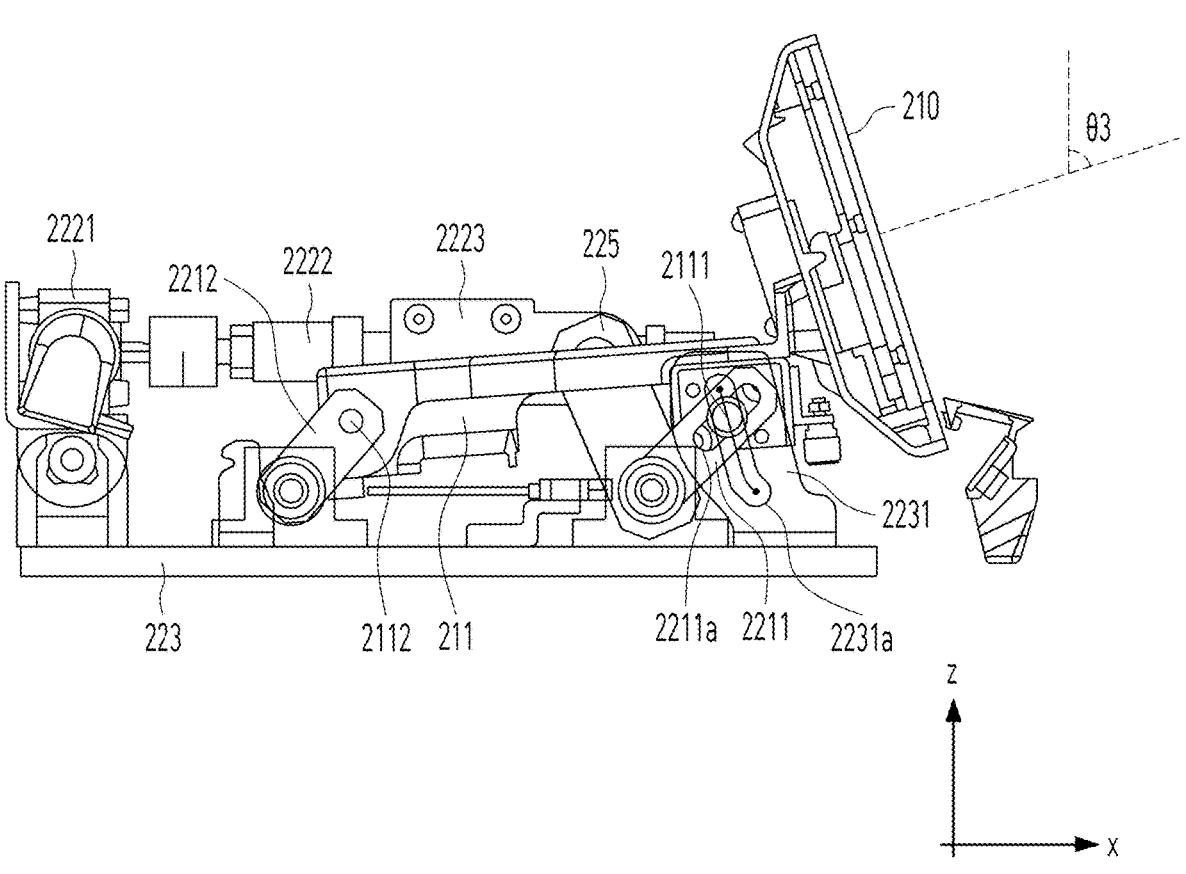
Figure 7:
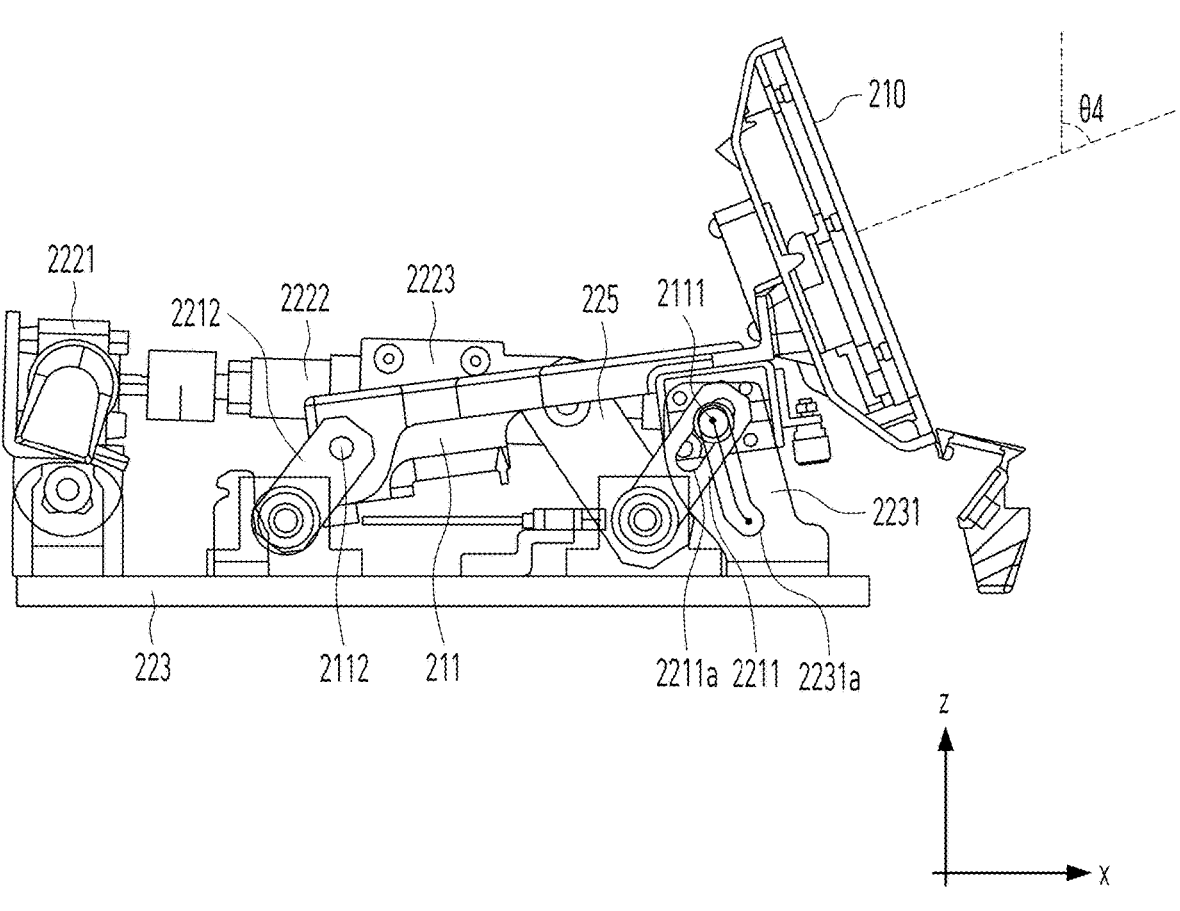

FIG. 4 shows a case where the height of the front display 210 is at the lowest point, and in this case, the front view of a driver or passenger may be maximized. In this state, the height of the front display 210 may be adjusted depending on the position of a specific facial portion of the driver through the camera 140 described above in FIG. 3.

Specifically, a ball screw bolt 2222 may rotate by the operation of a drive motor 2221. A ball screw nut 2223 may move in a straight line by the rotation of the ball screw bolt 2222. A rotation plate 225 extending from the outer peripheral surface of a rotation shaft 224 may be rotatably coupled to the side of the ball screw nut 2223. Thus, when the ball screw nut 2223 moves linearly, the rotation plate 225 may rotate together with the rotation shaft 224.

A support bracket 211, which is coupled to the rear surface of the front display 210, may be rotatably coupled to one side of a first link 2211. The rotation shaft 224 may be coupled to the other side of the first link 2211. In addition, the other side of the first link 2211 may be rotatably coupled to a fixed bracket 223.

A first rotation protrusion 2111 formed on one side of the support bracket 211 may be inserted into a first guide groove 2211a formed on the first link 2211. The fixed bracket 223 may include a guide plate 2231 into which the first rotation protrusion 2111 is inserted.

A second rotation protrusion 2112 may be formed on the other side of the support bracket 211. The second rotation protrusion 2112 may be inserted into one side of a second link 2212. The other side of second link 2212 may be rotatably coupled to the fixed bracket 223.

In particular, the first link 2211 may include the first guide groove 2211a formed longitudinally at one side thereof. The first rotation protrusion 2111 may be inserted into the first guide groove 2211*a*. The guide plate 2231 may include a second guide groove 2231*a* having a curved shape. The first rotation protrusion 2111 is inserted into the second guide groove 2231*a*.

Therefore, the rotation of the ball screw bolt 2222 and the linear movement of the ball screw nut 2223 are driven by the drive motor 2221. The rotation of the ball screw bolt 2222 and the linear movement of the ball screw nut 2223 may rotate the first link 2211 and the second link 2212, enabling the support bracket 211 to move and thus adjusting the height of the front display 210.

In particular, as described above, while the front display 210 is moving, the front display 210 also needs to rotate to align with the position of the specific facial portion of the driver. In other words, to align with the position of the specific facial portion of the driver, the angles of θ1, θ2, θ3, and θ4 shown in FIGS. 4 to 7 may all be different. The angles of θ1, θ2, θ3, and θ4 may be associated with the movement of the ball screw nut 2223.

In addition, due to the structure in which the front display 210 is inserted and mounted into the mounting portion 120 of the vehicle 100 described above, it is necessary to protect a front lower part of the front display 210 while the front display 210 is moving.

To this end, the display device 200 according to the embodiment of the present disclosure may enable the front display 210 to rotate and move in a curved path during the movement of the front display 210. This may be implemented through the second guide groove 2231*a*, which is formed with a curved shape in the guide plate 2231, and the first guide groove 2211*a*, which is formed longitudinally at one end of the first link 2211.

That is, the first rotation protrusion 2111 formed on the support bracket 211 may be inserted into the first guide groove 2211*a* and the second guide groove 2231*a*, allowing the support bracket 211 to rotate and move in a curved path when the first link 2211 rotates.

Therefore, in the display device 200 according to the embodiment of the present disclosure, the drive module 220 may adjust the height of the front display 210 through a four-bar linkage structure involving four rotation points formed on the first link 2211, second link 2212, and support bracket 211.

Additionally, the front display 210 may rotate and move in a curved path to align with the specific facial portion of the driver and to protect the front lower part of the front display 210.

Referring to FIG. 8, in the display device 200 according to the embodiment of the present disclosure, a drive module 220 may include the position detection sensor 226 that detects the height of the front display 210.

In an embodiment, the position detection sensor 226 may be located at the top of a fixed bracket 223. The drive module 220 may include a detection plate 227 extending from the outer peripheral surface of a rotation shaft 224 at a position corresponding to the position detection sensor 226. Therefore, the detection plate 227 may rotate together with the rotation shaft 224, and the position detection sensor 226 may detect the height of the front display 210 by detecting a change in the position depending on the rotation of the detection plate 227.

Figure 9:
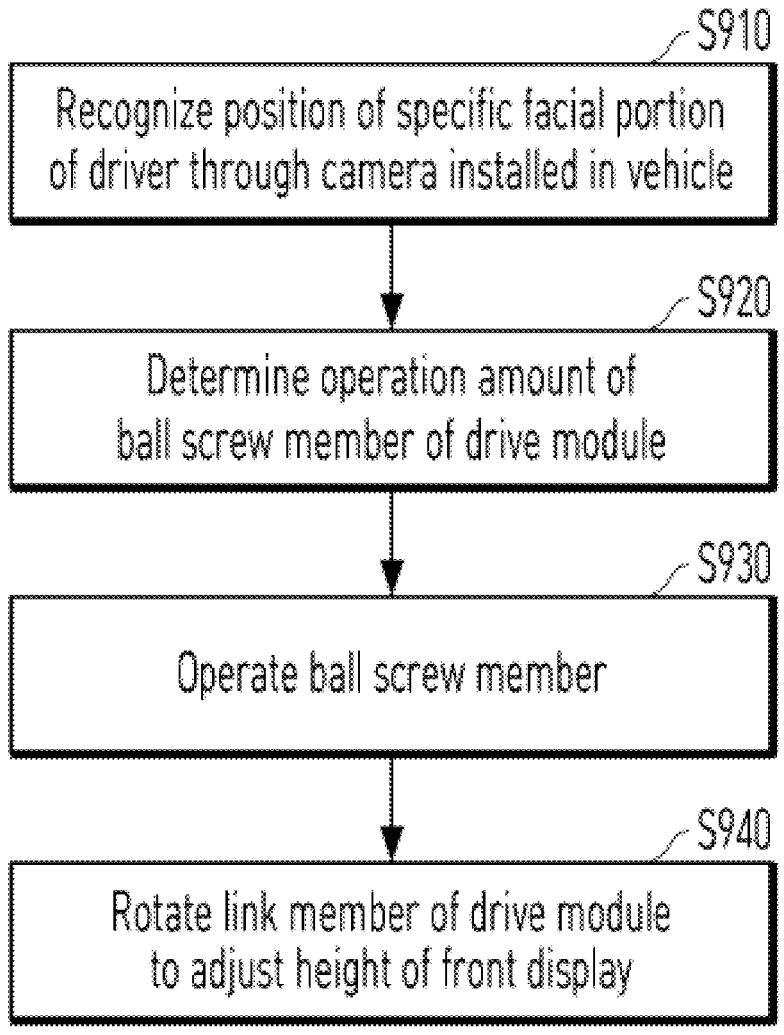
FIG. 9 is a diagram for explaining a method of controlling a display device according to an embodiment of the present disclosure.
Figure 10:
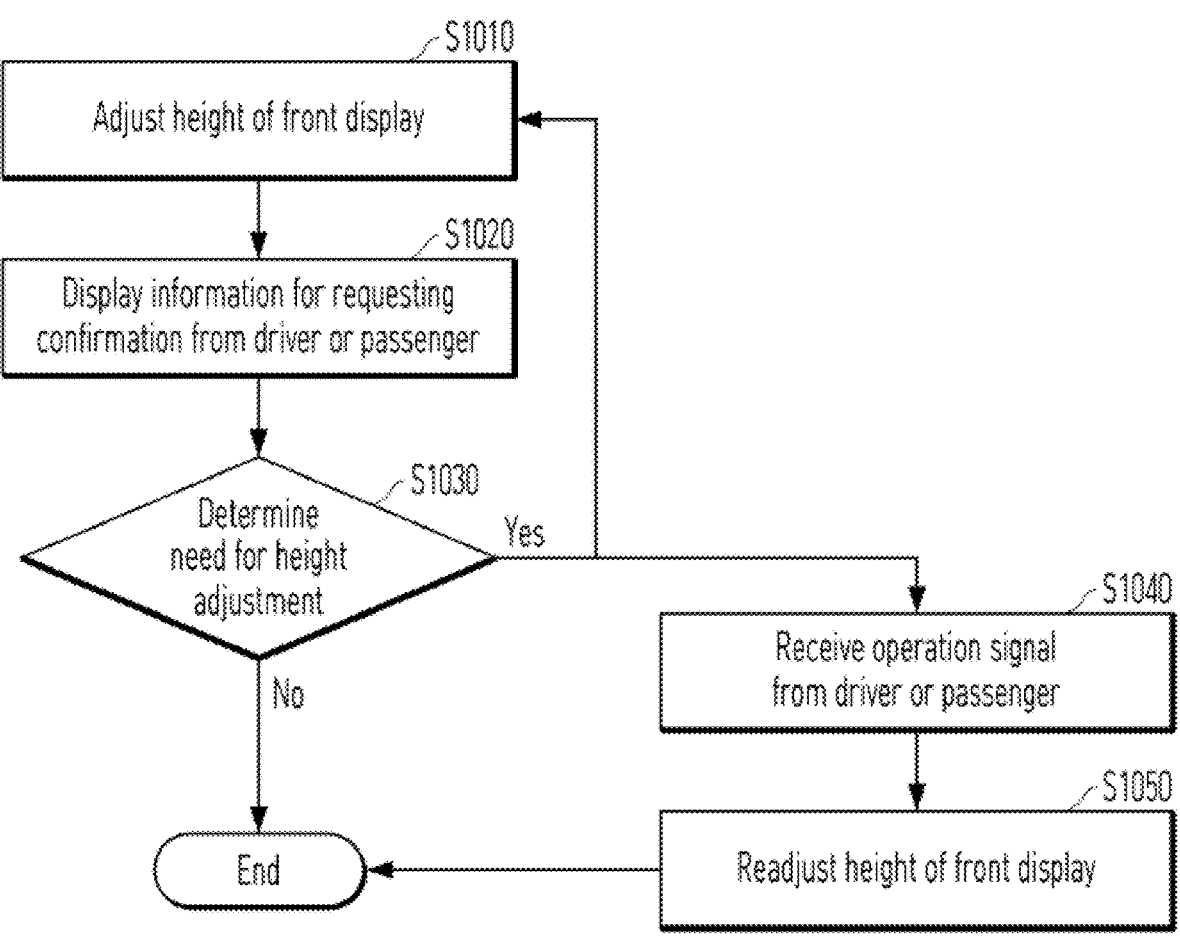
FIGS. 10 and 11 are diagrams for explaining various embodiments of a display device control method according to the present disclosure.
Figure 11:
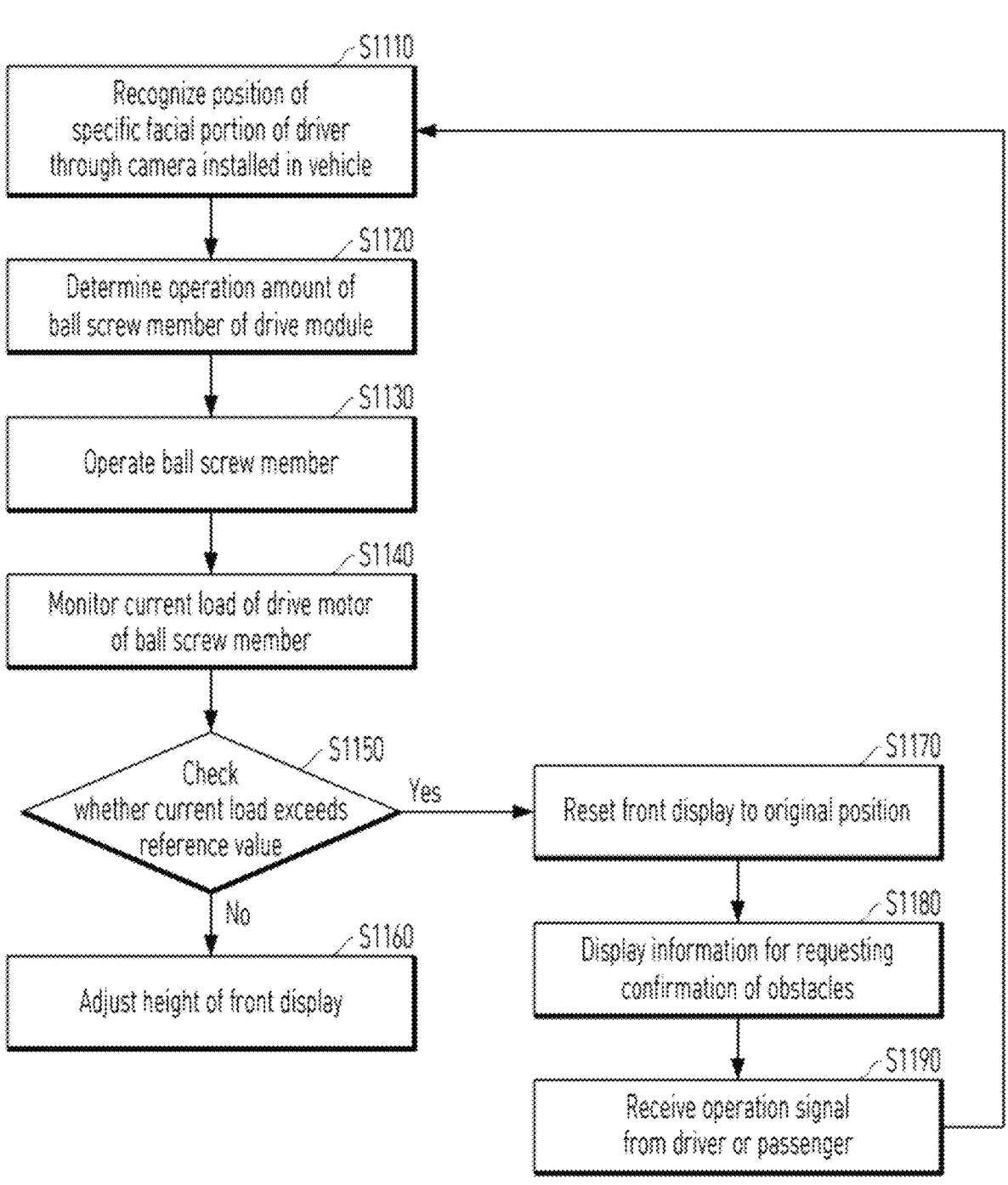

FIG. 9 is a diagram for explaining a method of controlling a display device according to an embodiment of the present disclosure. FIGS. 10 and 11 are diagrams for explaining various embodiments of a display device control method according to the present disclosure.

Hereinafter, the display device control method according to the embodiment of the present disclosure will be described based on the content described above with reference to FIGS. 1 to 8.

In the display device control method according to the embodiment of the present disclosure, the position of a specific facial portion of a driver may be recognized through a camera 140 mounted on a vehicle 100 (S910). Then, the operation amount of a ball screw member 222 of a drive module 220 may be determined based on the recognized position of the specific facial portion (S920). Here, the operation amount of the ball screw member 222 may refer to the movement amount of a ball screw nut 2223 when the ball screw nut 2223 moves in a straight line. Accordingly, the rotation amount of the ball screw bolt 2222 through the operation of a drive motor 2221 may be determined.

Through the operation of the ball screw member 222 (S930), a link member 221 of the drive module 220 may rotate, thereby adjusting the height of a front display 210 (S940). In particular, the display device control method according to the embodiment of the present disclosure may adjust the height of the front display 210 to align with the position of the specific facial portion of the driver and control the front display 210 to rotate and move in a curved path to protect a front lower part of the front display 210.

FIG. 10 is a diagram for explaining another embodiment of the display device control method according to the present disclosure.

After adjustment of the height of a front display 210 (S1010), information for requesting confirmation from a driver or passenger may be displayed (S1020). The information for requesting confirmation from the driver or passenger may be displayed on the screen of the front display 210, and the displayed information for requesting confirmation may include, for example, whether adjustment of the height of the front display 210 is necessary as shown in FIG. 10 (S1030).

If the driver or passenger determines that the height adjustment is not necessary, the adjusted height of the front display 210 may be maintained. On the other hand, if the driver or passenger determines that the height adjustment is necessary, an operation signal from the driver or passenger may be received (S1040). The operation signal from the driver or passenger may include, for example, adjusting the height of the front display 210 through a touch on the screen of the front display 210. In addition, based on the operation signal from the driver or passenger, the height of the front display 210 may be readjusted (S1050). Additionally, the display may be automatically adjusted by an operation signal that is based on detection of a position of a specific facial portion of the driver or the front passenger by the camera 140.

Alternatively, the displayed information for requesting confirmation may include information for proceeding to the step of adjusting the height of the front display 210 (S1010). The driver or passenger may initiate the height adjustment step (S1010) again by touching the screen of the front display 210.

FIG. 11 is a diagram for explaining a further embodiment of the display device control method according to the present disclosure.

After recognizing the position of a specific facial portion of a driver through a camera 140 mounted on a vehicle 100 (S1110), the operation amount of a ball screw member 222 of a drive module 220 may be determined depending on the position of the recognized specific facial portion (S1120). The ball screw member 222 may operate based thereon (S1130).

In this case, a current load of the drive motor 2221 of the ball screw member 222 may be monitored (S1140), and it may be determined whether the monitored current load exceeds a reference value (S1150). This is because, if the operation of the drive module 220 is obstructed by obstacles, it may lead to damage of the display device 200. If the monitored current load does not exceed the reference value, the operation of the ball screw member 222 may continue, allowing the height of a front display 210 to be adjusted (S1160).

On the other hand, if the monitored current load exceeds the reference value, that is, if the operation of the drive module 220 is obstructed by obstacles, the front display 210 may be returned to the original position (S1170). Thereafter, information for requesting confirmation of obstacles may be displayed (S1180). The information for requesting confirmation of obstacles may be displayed on the screen of the front display 210. In addition, an operation signal from the driver or passenger may be received (S1190).

The operation signal from the driver or passenger may be received, for example, through a touch on the screen of the front display 210. After removing any obstacles that obstruct the operation of the drive module 220, the driver or passenger may send the operation signal to enable the drive module 220 to operate again through the touch on the screen of the front display 210. Thereafter, the display device control method may return to the step of recognizing the position of the specific facial portion of the driver through the camera 140 mounted on the vehicle 100 (S1110).

The present disclosure further includes a system for adjusting a position of a display device in a vehicle. The system includes: the front display 210 that is located in front of a driver seat and a passenger seat of the vehicle 100; the camera 140 configured to detect a position of a specific facial portion of an occupant in the driver seat or the passenger seat; the drive module 220 that is in communication with the camera 140 and configured to provide a driving force to enable movement of the front display 210; a controller (e.g., a processor) configured to control the drive module 220 to adjust a position of the front display 210 to provide optimal viewing by the occupant. The movement of the front display 210 includes at least one of a linear movement, a rotational movement, a movement in a curved path, or any combination thereof.

In summary, the display device and control method thereof according to the present disclosure may adjust the height of the display depending on the position of the specific facial portion of the driver, thereby effectively providing various convenience information. Additionally, the display device and control method thereof according to the present disclosure may efficiently control the movement and tilting of the display through the drive module including the ball screw member and the link member.

The detailed description above should not be interpreted restrictively in all respects but should be considered as illustrative. The scope of the present disclosure should be determined by a reasonable interpretation of the appended claims, and all changes within the equivalent scope of the present disclosure are encompassed within the scope of the present disclosure.

What is claimed is:

1. A display device for a vehicle, the display device comprising:

a front display positioned in front of a driver seat and a passenger seat of the vehicle; and a drive module linked to a camera installed in the vehicle and comprising a ball screw member and a link member, wherein the drive module is configured to adjust a position of the front display based on a position of a specific facial portion of an occupant in the driver seat or the passenger seat by providing a driving force to rotate the link member based on an operation of the ball screw member to enable movement of the front display.

2. The display device of claim 1, further comprising:

a support bracket coupled to a rear surface of the front display, wherein the link member is rotatably coupled to the support bracket, and wherein the ball screw member is connected to the link member and configured to move in a straight line and rotate the link member.

3. The display device of claim 2, wherein the support bracket comprises:

a first rotation protrusion formed on a first side thereof; and a second rotation protrusion formed on a second side thereof, wherein the link member comprises:

a first link into which the first rotation protrusion is inserted on a first side thereof, wherein the first link comprises a first guide groove formed longitudinally; and a second link into which the second rotation protrusion is inserted on the first side thereof.

4. The display device of claim 3, wherein the drive module further comprises a fixed bracket formed to rotatably couple a second side of the first link and a second side of the second link.

5. The display device of claim 4, wherein the fixed bracket comprises a guide plate having formed thereon a second guide groove into which the first rotation protrusion is inserted, and wherein the second guide groove is configured to guide a curved movement of the support bracket.

6. The display device of claim 4, wherein the drive module further comprises:

a rotation shaft coupled to the second side of the first link; and a rotation plate extending from an outer peripheral surface of the rotation shaft and coupled to the ball screw member.

7. The display device of claim 2, wherein the ball screw member comprises:

a drive motor;

a ball screw bolt configured to rotate based on an operation of the drive motor; and a ball screw nut configured to move in a straight line based on the rotation of the ball screw bolt.

8. The display device of claim 1, wherein the drive module comprises a position sensor configured to detect the position of the front display.

9. The display device of claim 1, wherein the position of the front display comprises a height of the display.

10. The display device of claim 1, wherein the movement of the front display includes at least one of a linear movement, a rotational movement, a movement in a curved path, or any combination thereof.

11. A method of controlling a position of a display device for a vehicle, the method comprising:

recognizing a position of a specific facial portion of an occupant in a driver seat or a front passenger seat of the vehicle by a camera installed in the vehicle;

determining an operation amount of movement for a ball screw member of a drive module based on the recognized position of the specific facial portion; and adjusting a position of a front display located in front of the driver seat and the passenger seat of the vehicle by rotating a link member of a drive module based on an operation of the ball screw member.

12. The method of claim 11, comprising:

receiving an operation signal from the occupant to adjust the position of the front display; and readjusting the position of the front display based on to the received operation signal.

13. The method of claim 11, wherein the position of the front display comprises a height of the display.

14. The method of claim 11, wherein the movement of the front display includes at least one of a linear movement, a rotational movement, a movement in a curved path, or any combination thereof.

15. The method of claim 12, wherein the operation signal from the occupant comprising a driver or a passenger is actuated by a touch on a screen of the display.

16. The method of claim 12, wherein the display is automatically adjusted by the operation signal that is based on detection of the position of the specific facial portion of the occupant comprising a driver or a passenger by the camera.

17. A system for adjusting a position of a display device in a vehicle, the system comprising:

a front display located in front of a driver seat and a passenger seat of the vehicle;

a camera configured to detect a position of a specific facial portion of an occupant in the driver seat or the passenger seat;

a drive module comprising a ball screw member and a link member, the drive module in communication with the camera and configured to provide a driving force to enable movement of the front display; and a processor configured to control the drive module to adjust a position of the front display by rotating the link member based on an operation of the ball screw member to provide optimal viewing of the front display by the occupant.

18. The system of claim 17, wherein the movement of the front display includes at least one of a linear movement, a rotational movement, a movement in a curved path, or any combination thereof.

* * * * *